United States Patent [19]

Scheidweiler

[11] 4,384,488

[45] May 24, 1983

[54] SMOKE DETECTOR

[75] Inventor: Andreas Scheidweiler, Uerikon, Switzerland

[73] Assignee: Cerberus AG, Männedorf, Switzerland

[21] Appl. No.: 257,784

[22] Filed: Apr. 27, 1981

[30] Foreign Application Priority Data

May 9, 1980 [CH] Switzerland ........................ 3641/80

[51] Int. Cl.[3] ........................................ G01D 11/24

[52] U.S. Cl. ........................................ 73/431; 250/384

[58] Field of Search ........................ 340/628, 629, 630; 138/43, 42; 251/231, 285, 121; 98/41 R; 250/284, 285; 73/431

[56] References Cited

U.S. PATENT DOCUMENTS

| | | | |
|---|---|---|---|
| 3,495,521 | 2/1970 | Foster | 98/41 R |
| 3,903,419 | 9/1975 | Lehsten | 250/284 |
| 3,908,957 | 9/1975 | Schutt | 340/629 |
| 4,220,862 | 9/1980 | Byrne | 250/385 |

FOREIGN PATENT DOCUMENTS

| | | | |
|---|---|---|---|
| 2430612 | 3/1980 | France | 340/629 |
| 53-33797 | 2/1978 | Japan . | |
| 551057 | 5/1974 | Switzerland . | |

OTHER PUBLICATIONS

Bulletin Des Schweizerischen Elektrotechnischen Vereins, Band 43 No. 23, Nov. 1952 Meili: "Ionisations-Feuermelder" pp. 933–939.

Electronique Industrielle No. 79 Dec. 1964 Henry: "La detection dlectronique des incendies" pp. 437–441.

*Primary Examiner*—S. Clement Swisher

*Attorney, Agent, or Firm*—Werner W. Kleeman

[57] ABSTRACT

A smoke detector containing at least one smoke measuring chamber which possesses a mounting or socket plate having an upper surface intended to be mounted at the ceiling of a room or other appropriate area to be monitored and a housing enclosing the smoke measuring chamber and suspendingly secured at the socket plate. The housing possesses openings for the entry of the ambient air into the smoke measuring chamber. The smoke detector comprises a manually adjustable device by means of which it is possible to change the air entry openings in a manner such that the smoke detector can be accommodated to different environmental or ambient conditions, especially those containing different quantities of dust and other contaminants.

9 Claims, 3 Drawing Figures

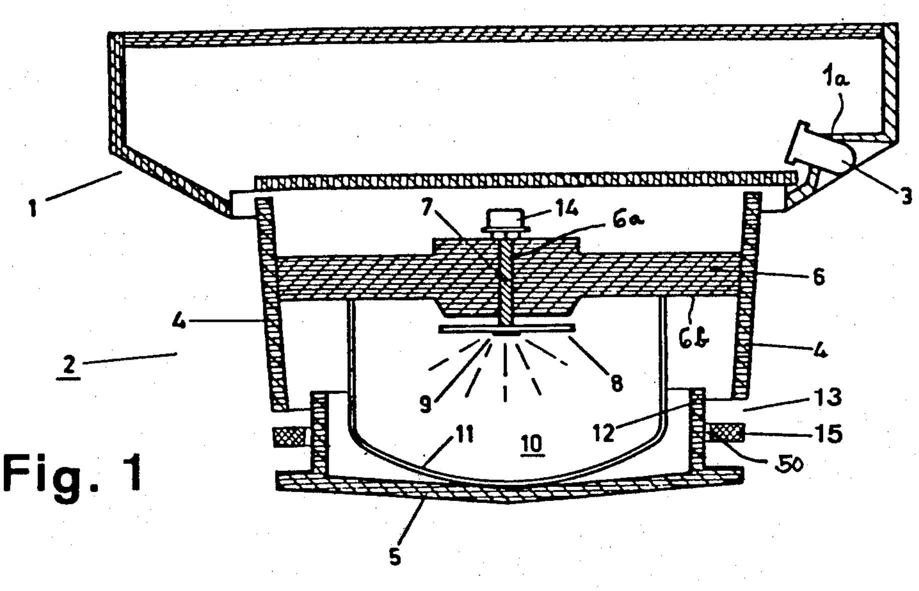
Fig. 1
Fig. 2
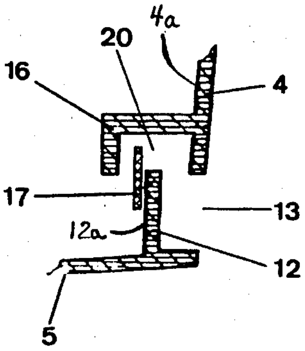
Fig. 3
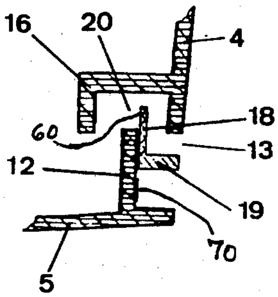

SMOKE DETECTOR

BACKGROUND OF THE INVENTION

The present invention relates to a new and improved construction of smoke detector.

Generally speaking, the smoke detector of the present development is of the type containing at least one smoke measuring chamber, which is provided with a socket or mounting plate having an upper surface intended to be mounted at the ceiling of a room or area to be monitored and a housing enclosing the smoke measuring chamber and suspendingly attached at the socket plate. The housing is provided with access or entry openings for the entry of the ambient air into the smoke measuring chamber.

During the detection of combustion processes or fires it is important to detect the same as early as possible, in order to prevent the occurrence of a great deal of damage by rapidly undertaking appropriate counteractive and fire fighting measures, i.e. placing into operation fire fighting equipment and personnel, as well as warning possibly endangered occupants early enough. Frequently toxic gases and vapours, which can endanger human life, occur at the incipient stages of fires, i.e. when there are present smouldering fires as opposed to open or licking flames.

For the purpose of detecting fires at an incipient stage there have been found to be particularly useful smoke detectors, since they are capable of responding to a parameter of a combustion process or fire which already occurs at an extremely early point in time. For a smoke detector or alarm to respond it is necessary that smoke, or stated in physical terms, a combustion aerosol enter the smoke detector. In this context transport problems with respect to the smoke i.e. aerosol particles or the like play an appreciable role. The mere occurrence of smoke at the site of the fire is not sufficient for response of the smoke detector and for triggering of an alarm. Additionally, it is necessary that an adequate quantity of smoke is transported into the measuring chamber of the smoke detector. Within the measuring chamber there can be then detected in conventional manner the smoke or aerosol particles, for instance by means of the scattered light (optical smoke detectors) occurring at a light beam emanating from a light source, or by means of the change in the current flow in an ionization chamber (ionization fire alarm), or also by other techniques, for instance measuring the change in the conductivity, the humidity or the ion density of the ambient air. The energy needed for transport of the smoke into the measuring chamber, in most instances, is furnished by the heat which evolves during oxidation.

In numerous patent publications both of the predominantly employed types of detectors are repeatedly modified, in order to accommodate them to special fields of application or special requirements. From the multiplicity of patents in this technology there are here only mentioned by way of example Swiss Pat. No. 264,020, Swiss Pat. No. 468,683, Swiss Pat. No. 508,251 and Swiss Pat. No. 551,057 relating to ionization fire alarms, and Swiss Pat. No. 417,405 and Swiss Pat. No. 592,932 relating to optical smoke detectors.

In the case of optical smoke detectors the measuring chamber is extensively closed, in order to suppress as much as possible the affect of spurious light. In order to eliminate the triggering of false alarms by light which penetrates through the smoke entry or access openings, there is provided a closure cover in the scattered light-smoke detector of Japanese Pat. No. 52-133 797, which automatically closes the smoke entry openings as soon as a signal delivered by a photodetector exceeds a predetermined threshold value. If the signal is caused by scattered light then there is suppressed an alarm and the smoke entry openings are automatically again opened, in order to place the smoke detector in its operationally preparatory state.

During the construction of ionization-smoke detectors it is essentially attempted to design the measuring chamber such that it is extensively open to the ambient atmosphere, in order to achieve unhindered entry of the combustion aerosols or the like. For instance, with a number of prior art constructions the measuring chamber is only separated from the external atmosphere by a grid-like hood or a hood possessing relatively large grid-like openings.

However, all of the described constructions possess the drawback that they are exposed to a pronounced extent to natural dust contamination. In order to eliminate this shortcoming it has been proposed retarding the air entry into the ionization chamber by the use of suitable means which brake the airflow or deflect the same, in order to cause the deposition of the dust or other contaminants before the same enters the actual measuring chamber. However, with this technique there is also rendered more difficult the entry of the combustion aerosols into the measuring chamber which must be detected, leading to an undesired reduction in the response sensitivity of the smoke detector.

An appreciable drawback of the heretofore known smoke detectors or alarms resides in the fact that for each field of application there must be developed specially designed smoke detectors or alarms, in order to ensure that when encountering different environmental conditions there will be guaranteed in each case an optimum entry of the combustion aerosols into the fire alarm. This results in complicated manufacturing techniques, an unnecessary large storage requirement and unnecessary exchange of the alarm inserts upon change of the ambient conditions at the alarm erection site (absence or occurrence of dust contamination danger and so forth).

SUMMARY OF THE INVENTION

Therefore with the foregoing in mind it is a primary object of the present invention to provide a new and improved construction of smoke detector which is not associated with the aforementioned drawbacks and shortcomings of the prior art constructions.

Another and more specific object of the present invention aims at overcoming the disadvantages of the heretofore known smoke detectors and, in particular, devising a smoke detector which can be accommodated in a most simple manner to different environmental conditions.

A further significant object of the present invention aims at rendering possible with a simple constructional design that the smoke detector, in the presence of the momentarily encountered environmental conditions, enables an optimum entry of combustion aerosols into the smoke measuring chamber while simultaneously optimumly preventing the entry of dust or other contaminants which may cause spurious alarm triggering.

Now in order to implement these and still further objects of the invention, which will become more readily apparent as the description proceeds, the smoke detector of the present development is manifested by the features that there is provided a manually adjustable device for changing the air entry or access openings.

According to a preferred embodiment of the invention the manually adjustable device is constructed such that the adjustment of the air entry openings only is possible from the inside of the fire alarm or from externally thereof only when using a special tool.

According to a further preferred embodiment of the invention the manually adjustable device is structured such that it alters the outer air access or entry openings of the fire alarm. Additional, likewise preferred constructional manifestations of the invention reside in structuring the manually adjustable device such that it changes the inner or internal air access openings or, however, by adjusting the manually adjustable device there can be simultaneously altered both the inner and outer air entry or access openings of the smoke detector.

A further preferred embodiment of the invention resides in constructing the manually adjustable device such that it can be infinitely or stepwise changed and that the setting or adjustment of such device can be read or otherwise visually discerned externally of the detector at a marker or position indicator or the like.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a cross-sectional view through a smoke detector alarm where there can be altered the outer or external air entry or access openings;

FIG. 2 is a fragmentary cross-sectional view through a modified design of fire alarm or detector where there can be altered the internal air access or entry openings; and FIG. 3 is a cross-sectional view through a fire detector alarm at which there can be simultaneously changed or altered the external and internal air access or entry openings.

DETAILED DESCRIPTION OF THE PREFERRED EMBODIMENTS

Describing now the drawings, in FIG. 1 there is illustrated by way of example and not limitation an ionization fire alarm composed of a socket or mounting portion 1 and a fire alarm insert 2. The socket portion or member 1 is laterally provided with a recess or opening 1*a* into which there can be conveniently fitted any suitable alarm indication lamp 3 or other appropriate alarm indicator, for instance a luminescent diode.

The alarm insert or insert unit 2 comprises a housing 4, 5 composed of a substantially cylindrical or slightly conical sleeve member 4 and a lower cover member 5. Between the sleeve member 4 and the cover member 5 there is located a substantially ring-shaped or annular slot 13 for the entry of air into the interior of the housing 4, 5. At the inside of the cover member 5 there is provided a substantially cylindrical web 12, by means of which there can be braked the inflowing air and dammed-up before it reaches the interior of the housing 4, 5. A manually adjustable device, here shown for instance as a ring member 15 is located at the cylindrical web 12. The ring member 15 can be selectively displaced in axial direction such that the ring-shaped slot 13 or equivalent structure, forming the outer or external air entry or access opening, can be changed in its width. To this end, the ring member 15 and outer wall of the web 12 can be respectively provided with standard internal and external threading, generally indicated by reference character 50 to enable infinite or stepwise adjustment of the ring member 15 axially along the web 12, and thus control of the size of the air entry opening 13.

In the interior of the housing 4, 5 there is arranged a carrier or support plate 6 formed of a suitable insulating material at which there are mounted all of the further components of the fire alarm or smoke detector. A central bore 6*a* contains a metal punch or plunger 7 or equivalent structure which carries a substantially disc-shaped inner electrode 8 provided with a suitable radioactive preparation or substance 9. At the underside 6*b* of the support plate 8 there is further mounted a counter electrode 11 formed as a wire grid having numerous small openings, which have not been particularly shown but are conventional and as is well known in this technology. The counter electrode 11 surrounds the inner electrode 8 and protects such against contact. This inner or intermediate electrode 8 and the counter electrode 11 define the ionization chamber 10. Above the support plate 6 there can be provided a conventional electrical circuit for evaluation of the changes in ionic current flow within the ionization chamber 10. The ionization measuring chamber 10 can be provided with a standard reference-ionization chamber which is almost completely obturated from the ambient atmosphere and which in conventional manner is connected in series with the ionization chamber 10. The cover member or cover 5 of the housing 4, 5 is advantageously designed such that it can be removed from the housing portion or sleeve member 4 in order to facilitate cleaning of the smoke detector.

FIG. 2 is a fragmentary sectional view of a further embodiment of fire alarm or detector possessing the same technological advantages discussed above, wherein there is located at the inner wall 4*a* of the housing portion or sleeve member 4 a projection or protuberance 16 which ensures for a further deflection of the incoming air. In order to accommodate the smoke detector to different environmental or ambient conditions there is located at the inner side or surface 12*a* of the web 12 a displaceable adjustment cylinder 17 or the like which either adheres in a force-locking or frictional manner, due to the action of a certain pre-bias, at the inner wall 12*a* of the cylinder-shaped web 12, e.g. by forming the cylinder of a suitable elastic or resilient material, such as a plastics material, or which may be secured by not particularly illustrated but conventional attachment springs at a number of locations of the circumference at the outer side of the web or web member 12. By axially displacing the adjustment cylinder 17 it is possible to change the inner or internal air entry opening 20 of the smoke alarm. To provide for an infinite or stepwise change in the air entry cross-sectional area there also could be provided at the inner side of the web 12 grooves into which engage corresponding projections of the cylinder 17, or there can be provided appropriate grooves at the outer side of the web 12 in which there can engage corresponding projections of the attachment springs. Obviously, any other suitable measures may be employed for displaceably mounting the cylinder 17 for movement along the web 12.

FIG. 3 illustrates in fragmentary cross-sectional view a still further embodiment of fire alarm also having the same technological advantages as described heretofore, wherein at the inner side of the housing portion or sleeve member 4 there is provided a projection or protuberance 16 causing a further deflection of the incoming or entering air. In order to accommodate the smoke detector to different environmental or ambient conditions there is arranged at the outer side of the web 12 a substantially cylindrical adjustment ring member or ring 18 provided with a flange 19. The cylindrical ring 18 is arranged to be axially displaceable upon the web 12 in any convenient fashion, for instance as heretofore described in detail. For the infinite adjustment of the cylindrical ring 18 there also may be formed grooves or depressions at the web 12 into which there can engage appropriate projections of the cylindrical ring 18. During axial displacement of the cylindrical adjustment ring 18 there is simultaneously altered the cross-sectional area or size of the outer air entry opening 13 by the flange 19 and the inner air entry opening 20 by the upper edge or upright portion 60 of the cylinder or cylindrical ring 18. As shown schematically in FIG. 3, but equally useable in the arrangements of FIGS. 1 and 2, a suitable marker 70, such as a scale can be provided to visually indicate the position of the manually adjustment ring or the like or equivalent structure.

The exemplary embodiments described above in connection with the various figures and disclosed in conjunction with ionization fire or smoke alarms can be equally employed in analogous fashion in conjunction with optical smoke alarms. Apart from the embodiments disclosed heretofore and discussed in connection with FIGS. 1 to 3 it is also possible to construct fire alarms having an outer and inner portion serving for air deflection purposes, for instance as disclosed for the fire alarm or detector described in Swiss Pat. No. 475,614, such that either the openings of the outer or inner part of the casing can be altered by means of a mechanical adjustment device. The alteration or change of the inlet openings also can be accomplished such that parts of the outer and inner encasements or casings, located opposite one another, contact one another and possess air entry openings. In this connection the openings are arranged such that upon rotation of the enclosures or casings towards one another there is accomplished a corresponding enlargement or reduction in size of the air entry openings. Apart from these adjustable openings it is possible for a portion of the openings to be retained at parts of the casings or enclosures which do not contact one another.

While there are shown and described present preferred embodiments of the invention, it is to be distinctly understood that the invention is not limited thereto, but may be otherwise variously embodied and practiced within the scope of the following claims.

What I claim is:

1. A smoke detector comprising:

a housing enclosing at least one smoke measuring chamber;

said housing being provided with openings for the entry of ambient air into the smoke measuring chamber; and manually adjustable means for changing the air entry openings in order to accommodate the smoke detector to different ambient atmospheric conditions.

2. The smoke detector as defined in claim 1, wherein:

said manually adjustable means is structured for changing the cross-sectional area of the air entry openings of the smoke detector to accommodate the smoke detector to the degree of contamination of the surrounding atmosphere.

3. The smoke detector as defined in claim 1, wherein:

said air entry openings define inner and outer air entry openings; and said manually adjustable means serves to change the outer air entry openings of the smoke detector.

4. The smoke detector as defined in claim 1, wherein:

said air entry means define inner and outer air entry openings; and said manually adjustable means serves to change the inner air entry openings of the smoke detector.

5. The smoke detector as defined in claim 1, wherein:

said air entry openings define inner and outer air entry openings; and said manually adjustable means simultaneously changes the inner and outer air entry openings.

6. The smoke detector as defined in claim 1, wherein:

said manually adjustable means contains structure for accomplishing a stepwise change of the air entry openings.

7. The smoke detector as defined in claim 1, further including:

marking means for enabling discerning of the position of the manually adjustable means.

8. The smoke detector as defined in claim 1, wherein:

said manually adjustable means is structured such that it can be only adjusted from externally of the smoke detector.

9. The smoke detector as defined in claim 1, wherein:

said manually adjustable means is structured such that it only can be adjusted from the inside of the smoke detector.

* * * * *